US008683425B2

(12) United States Patent
Aryanto et al.

(10) Patent No.: US 8,683,425 B2
(45) Date of Patent: Mar. 25, 2014

(54) SYSTEM FOR GENERATING APPLICATION ARCHITECTURE DESIGN WORK PRODUCTS

(75) Inventors: Jeffrey Aryanto, Dallas, TX (US); Yixing Gong, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 13/253,181

(22) Filed: Oct. 5, 2011

(65) Prior Publication Data
US 2013/0091484 A1    Apr. 11, 2013

(51) Int. Cl.
*G06F 9/44* (2006.01)
(52) U.S. Cl.
USPC .......................... 717/103; 717/101; 717/102
(58) Field of Classification Search
USPC .................................................. 717/100–103
See application file for complete search history.

(56) References Cited

U.S. PATENT DOCUMENTS

| 8,316,346 | B2 * | 11/2012 | Ganapathy | 717/104 |
|---|---|---|---|---|
| 2005/0044197 | A1 | 2/2005 | Lai | |
| 2007/0074148 | A1 * | 3/2007 | Morgan | 717/101 |
| 2007/0083533 | A1 | 4/2007 | Mirkazemi et al. | |
| 2007/0143398 | A1 | 6/2007 | Graham | |
| 2009/0119637 | A1 * | 5/2009 | Ganapathy | 717/101 |
| 2010/0070556 | A1 | 3/2010 | Heusermann et al. | |

OTHER PUBLICATIONS

Broy, Manfred, "Architecture Driven Modeling in Software Development," 2004, IEEE.*
Trujillo et al., "Exploring Extensibility of Architectural Design Decisions," 2007, IEEE.*
Raghav, et al, Generation of AADL Architecture Consistent Work Products: Simulink Behavioral Models, and Distributed Embedded Software using OCARINA; AADL Workshop Jun. 12, 2009; 14th International Conference on Reliable Software Technologies; 17 pages.

* cited by examiner

*Primary Examiner* — Qing Chen
(74) *Attorney, Agent, or Firm* — Brown & Michaels, PC

(57) ABSTRACT

Retrieving a question regarding requirements of an application from a data object node of an architecture design solution repository with architecture design solutions comprising a plurality of data object trees each with a plurality of data object nodes. Displaying a question regarding the requirements of the application to an application user through an interface and receiving an indication of an answer chosen by the application user. Indicating within the data object node which answer was chosen by the application user and determining which data object node to retrieve a next question from based on answer indicated by the user. Determining which architecture design solution within the architecture design solution repository matches the requirements of the application indicated by the application user and generating an architecture design work product based on matching the data object nodes to architecture design solutions within the architecture design solution repository.

18 Claims, 14 Drawing Sheets

Fig. 4a

| Web | DMZ | Product | Back-end |

Question: What is the type of your WebSphere Portal Web site?

- ⊙ Internet
- ○ Intranet
- ○ both

SUBMIT

Fig. 4b

| Web | DMZ | Product | Back-end |

Question: What is the Web device to access this Internet WebSphere Portal Web Site?

- ⊙ Web browser
- ○ Mobile phones
- ○ both

SUBMIT

SYSTEM FOR GENERATING APPLICATION ARCHITECTURE DESIGN WORK PRODUCTS

BACKGROUND

The present invention relates to application architecture design, and more specifically to generating application architecture design work products.

Currently projects usually engage many architects to perform or generate the architecture design work or architecture design solutions. An architecture design solution is an approach that captures architecture design knowledge and experience and lends a solution to the project. Commonly, architecture design solutions are introduced to other architects via articles, papers and books.

During a project, an architect relies on their personal knowledge and experience to design architecture design solutions, and document architecture designs as work products for delivery to their team or to a client. It is often challenging to create successful architecture design work products, since the architecture design includes and covers many different aspects of an application, such as infrastructure architecture, application architecture, security architecture, etc. . . . and an understanding of each to find the best solution to build an application.

This approach relies heavily on individual knowledge and experience and does not guarantee that an architect provides the best architecture design solution to an application. Also, even though computer tools are available to help to create architecture design diagrams, the computer tools cannot generate those diagrams automatically according to application requirements. Furthermore, it is especially time consuming for an architect to document and format the architecture design solution documents as work products for delivery to the project.

SUMMARY

According to one embodiment of the present invention a method of customizing architecture design work products to requirements of an application, using an architecture design solution repository including architecture design solutions comprising a plurality of data object trees each with a plurality of data object nodes. The method comprising the steps of: a computer retrieving a question regarding the requirements of the application from the data object node of the architecture design solution repository; the computer displaying the question regarding the requirements of the application to an application user through an interface; the computer receiving an indication of answers chosen by the application user to the question displayed; the computer indicating within the data object node which answers were chosen by the application user; the computer determining from which data object node to retrieve another question based on the answers indicated by the application user, and repeating from the computer displaying questions regarding the requirements of the application to the application user through the interface until all questions are answered; the computer determining which architecture design solution within the architecture design solution repository matches the requirements of the application indicated by the application user; the computer generating an architecture design work product based on matching the data object nodes to architecture design solutions within the architecture design solution repository.

According to another embodiment of the present invention, a computer program product for customizing architecture design work products to requirements of an application, using an architecture design solution repository including architecture design solutions comprising a plurality of data object trees each with a plurality of data object nodes. The computer program product comprising: one or more computer-readable, tangible storage devices; program instructions, stored on at least one of the one or more storage devices, to retrieve a question regarding the requirements of the application from the data object node of the architecture design solution repository; program instructions, stored on at least one of the one or more storage devices, to display the question regarding the requirements of the application to an application user through an interface; program instructions, stored on at least one of the one or more storage devices, to receive an indication of answers chosen by the application user to the question displayed; program instructions, stored on at least one of the one or more storage devices, to indicate which answers were chosen by the application user; program instructions, stored on at least one of the one or more storage devices, to determine from data object node to retrieve another question based on the answers indicated by the application user, repeating program instructions, stored on at least one of the one or more storage devices, to display questions regarding the requirements of the application to the application user through the interface until all questions are answered; program instructions, stored on at least one of the one or more storage devices, to determine which architecture design solution within the architecture design solution repository matches the requirements of the application indicated by the application user; and program instructions, stored on at least one of the one or more storage devices, to generate an architecture design work product based on matching the data object nodes to architecture design solutions within the architecture design solution repository.

According to another embodiment of the present invention, a computer system for customizing architecture design work products to requirements of an application. The computer system comprises one or more processors, one or more computer-readable memories and one or more computer-readable, tangible storage devices; an architecture design solution repository comprising architecture design solutions comprising a plurality of data object trees each with a plurality of data object nodes; a work product generator linked to the architecture design solution repository for generating customizable architecture design work products for the application; program instructions, stored one at least one of the one or more storage devices for execution by at least one of the one or more processors via at least one of the one or more memories, to retrieve a question regarding the requirements of the application from the data object node of the architecture design solution repository; program instructions, stored one at least one of the one or more storage devices for execution by at least one of the one or more processors via at least one of the one or more memories, to display the question regarding the requirements of the application to an application user through an interface linked to the architecture design solution repository; program instructions, stored one at least one of the one or more storage devices for execution by at least one of the one or more processors via at least one of the one or more memories, to receive an indication of answers chosen by the application user to the question displayed through the interface; program instructions, stored one at least one of the one or more storage devices for execution by at least one of the one or more processors via at least one of the one or more memories, to indicate which answers were chosen by the application user within the data object node; program instructions, stored one at least one of the one or more storage devices for execution by at least one of the one or more processors via at least one of the one or more memories, to determine which data object node to retrieve a next question from based on answers indicated by the application user, repeating program instructions, stored on at least one of the one or more storage devices for execution by at least one of the one or more processors via at least one of the one or more memories, to display the question regarding the requirements of the application the application user through an interface until all questions are answered; program instructions, stored one at least one of the one or more storage devices for execution by at least one of the one or more processors via at least one of the one or more memories, to determine which architecture design solution within the architecture design solution repository matches the requirements of the application indicated by the application user; and program instructions, stored one at least one of the one or more storage devices for execution by at least one of the one or more processors via at least one of the one or more memories, to generate an architecture design work product through the work product generator based on matching the data object nodes to architecture design solutions within the architecture design solution repository.

BRIEF DESCRIPTION OF THE SEVERAL
VIEWS OF THE DRAWINGS

FIGS. 4a and 4b show examples of interfaces for carrying out the flowchart of FIGS. 3a-3c.

DETAILED DESCRIPTION

Currently many enterprises are using computer applications to do their business processing. Although those applications are working in different business areas, they are built using the same architecture solution, technology and products. Therefore, the architecture solutions, technology and products can be collected from implemented applications and re-applied to new applications.

In an embodiment of the present invention, a computer system transforms the workload of designing an architecture solution from depending on individual knowledge and experience to a computer system. This computer system can be widely used by architects to obtain architecture design based on the knowledge and experience collected from many subject matter experts and from many approved applications as well, improving the quality of the architecture design work products.

The computer system of an embodiment of the present invention obtains and stores the knowledge from subject matter experts in many areas of application architecture. After understanding the application requirements, an application architect can provide the system with application requirements to a specific project through specific questions and according to those answers, the computer system constructs the best architecture design solution for the application requirements as well as generate architecture design work products. The architecture design work products are generated in the standard, required document format, saving the architects a lot of time, and at the same time improving the quality of those work products.

Therefore, it is not necessary for an architect to "re-invent the wheel" in a new project and do the architect design work from scratch. By collecting solutions, technology and products into a computer system, it is much easier for an architect to access the architecture design solutions and apply them to new applications, helping the architect complete their work easily, quickly and with high quality.

Furthermore, by collecting and storing architecture design solutions that have been successfully implemented, it helps share the knowledge and experience of application architectural design among architects and among enterprise applications and therefore, the application architect is not solely relying on their specific knowledge and experience, where they may be lacking.

Figure 1:
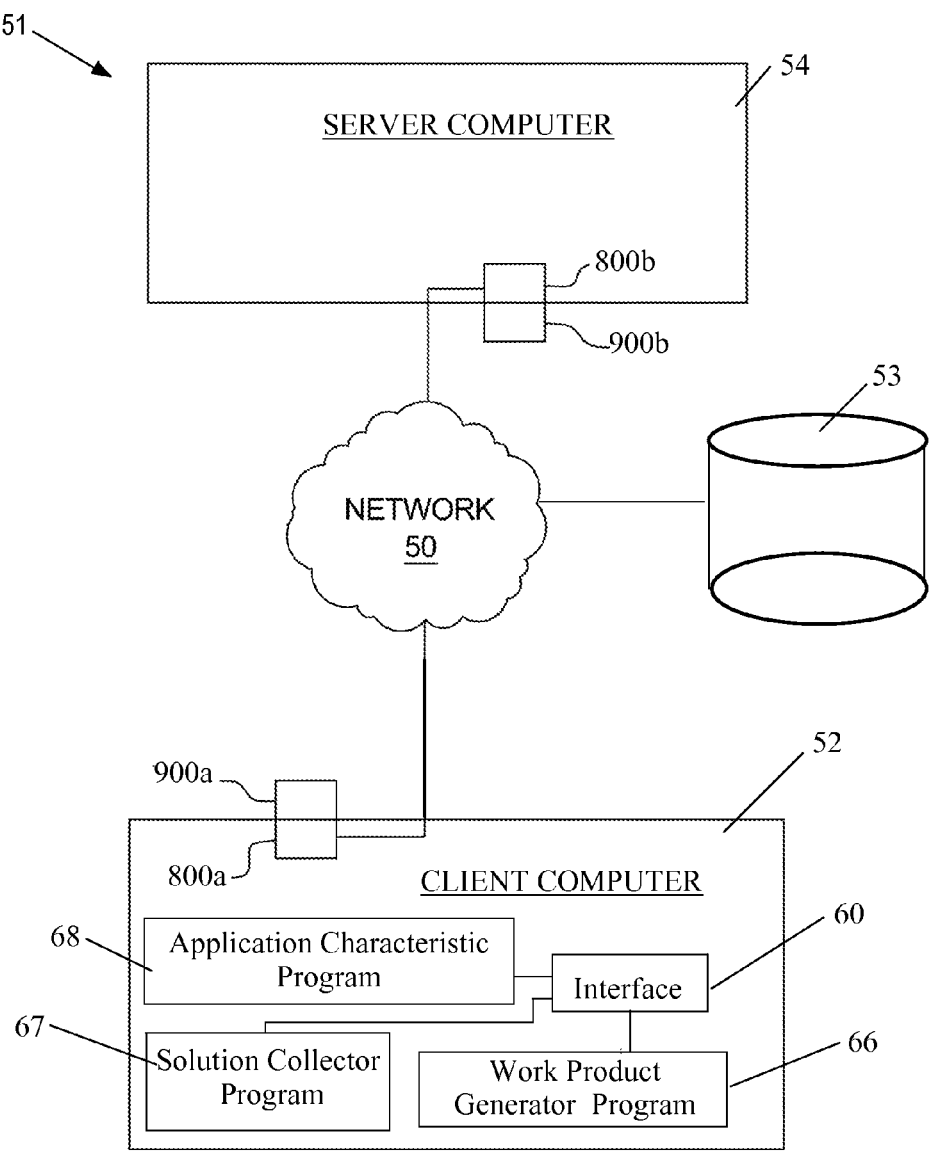
FIG. 1 depicts a pictorial representation of a network of computers in which illustrative embodiments may be implemented.

FIG. 1 is an exemplary diagram of a possible data processing environment in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, client computer 52, tangible storage device 53, and server computer 54 connect to network 50. In other exemplary embodiments, network data processing system 51 may include additional client computers, storage devices, server computers, and other devices not shown. Client computer 52 includes a set of internal components 800a and a set of external components 900a, further illustrated in FIG. 14. Client computer 52 may be, for example, a mobile device, a cell phone, a personal digital assistant, a netbook, a laptop computer, a tablet computer, a desktop computer, or any other type of computing device. Client computer 52 may contain an interface 60. Through interface 60, searches of architecture solutions may be performed and results of the searches may be displayed. Interface 60 may accept commands and data entry from a user. Interface 60 can be, for example, a command line interface, a graphical user interface (GUI), or a web user interface (WUI) through which a user can access a work product generator program 66, an application characteristic program 68, or a solution collector program 67 on either client computer 52 or server computer 54. Server computer 54 includes a set of internal components 800b and a set of external components 900b illustrated in FIG. 14.

In the depicted example, server computer 54 provides information, such as boot files, operating system images, and applications to a client computer 52. Server computer 54 can compute the information locally or extract the information from other computers on network 50.

Figure 14:
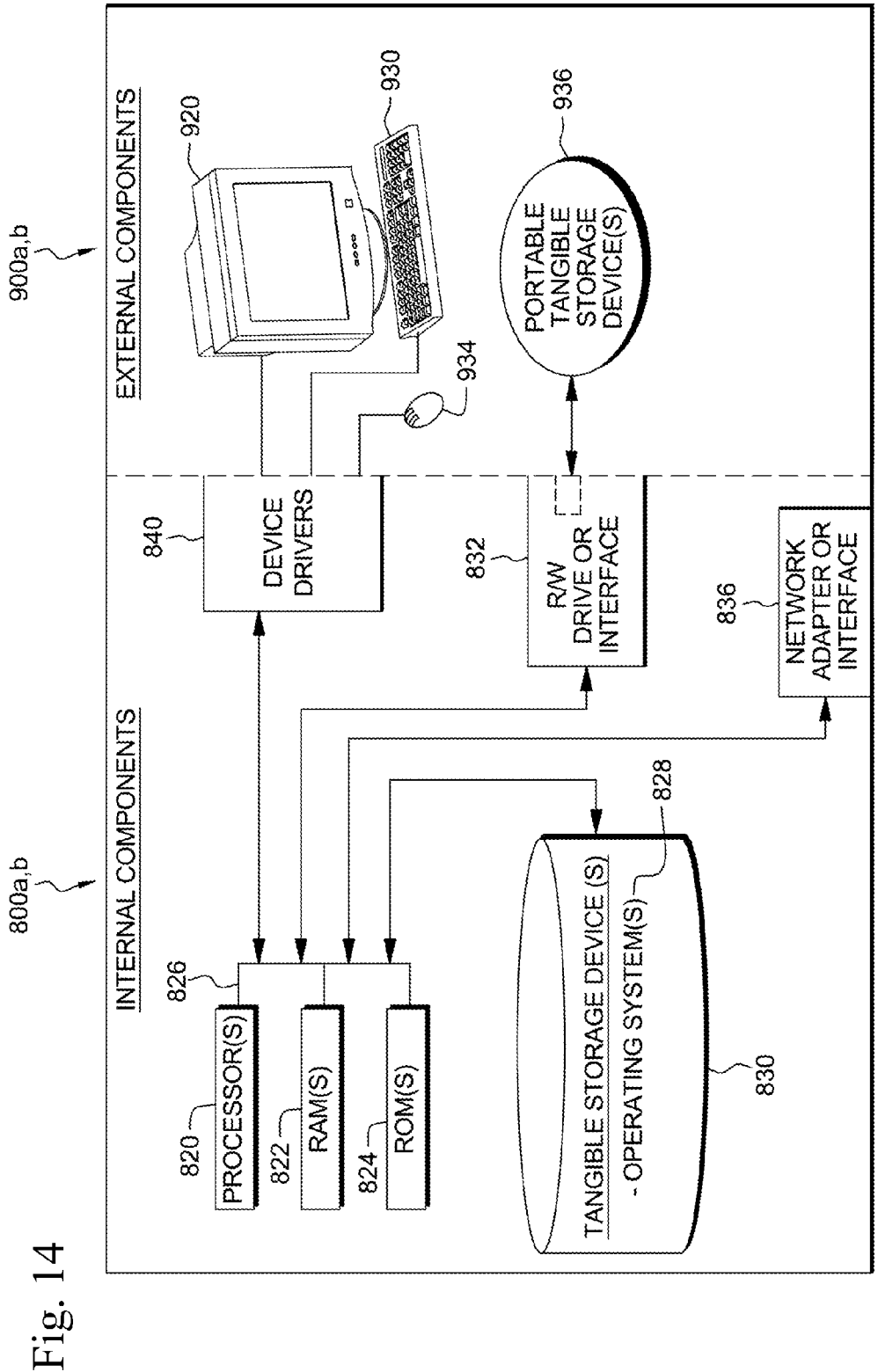
FIG. 14 illustrates internal and external components of a client computer and a server computer in which illustrative embodiments may be implemented.

Program code and programs such as a work product generator program 66, an application characteristic program 68 and a solution collector program 67 may also be located in network data processing system 51 and may be stored on at least one of one or more computer-readable tangible storage devices 830 shown in FIG. 14, on at least one of one or more portable computer-readable tangible storage devices 936 as shown in FIG. 14, on tangible storage device 53 connected to network 50, or downloaded to a data processing system or other device for use. For example, program code and programs such as a work product generator program 66, an application characteristic program 68 and a solution collector program 67 may be stored on at least one of one or more tangible storage devices 830 on server computer 54 and downloaded to client computer 52 over network 50 for use on client computer 52. Alternatively, server computer 54 can be a web server, and the program code and programs such as a work product generator program 66, an application characteristic program 68 and a solution collector program 67 may be stored on at least one of the one or more tangible storage devices 830 on server computer 54 and accessed on client computer 52. A work product generator program 66, an application characteristic program 68, and a solution collector program 67 can be accessed on client computer 52 through interface 60. In other exemplary embodiments, the program code and programs such as a work product generator program 66, an application characteristic program 68 and a solution collector program 67 may be stored on at least one of one or more computer-readable tangible storage devices 830 on client computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2:
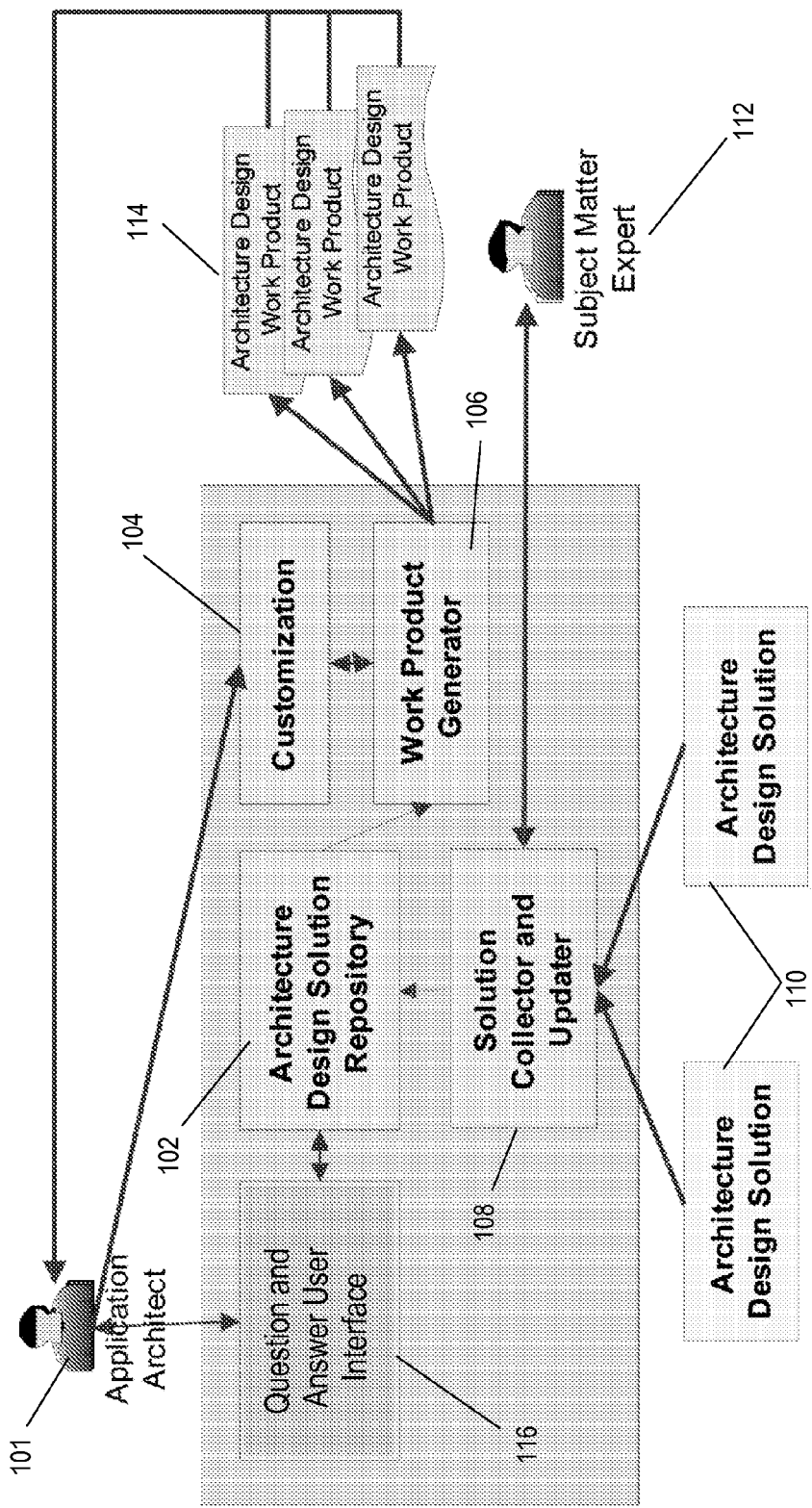
FIG. 2 shows an example of components of the framework for a system of an embodiment of the present invention.

FIG. 2 refers to an example of an architecture system for generating and collecting application architecture design work products. Architecture system 100 may be part of the network data processing system 51 shown in FIG. 1.

The architecture system 100 includes a question and answer user interface 116, which may use an application characteristic program 68 through interface 60 as shown in FIG. 1, accessed by an application architect or other user 101. The question and answer user interface 116 is linked to an architecture design solution repository 102. The architecture design solution repository 102 may be the tangible storage device 53 as shown in FIG. 1 or another storage device. The architecture design solution repository 102 is linked to a solution collector and updater 108 which may use a solution collector program 66 to update the architecture design solution repository 102 with architecture design solutions 110. A subject matter expert 112 may also contribute architecture design solutions 110 to the solution collector and updater 108. The architecture design solution repository 102 is linked to a work product generator 106 which may use a work product generator program 66 to generate an architecture design work product 114 from the architecture design solution repository 102. The work product generator 106 and the architecture design work product 114 itself may be customized 104 by the application architect 101.

The question and answer user interface 116 provides the application architect 101 with questions regarding the architecture design based on application architecture requirements.

Figure 10:
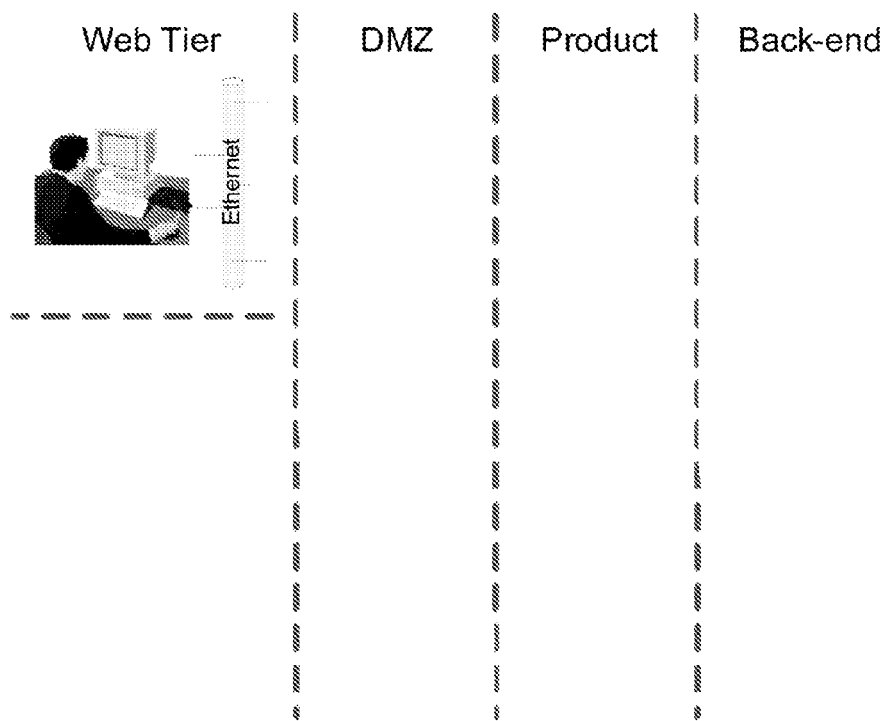
FIG. 10 shows an example of an operational model diagram from data objects of a data object tree if the type of website is Intranet only.

For example, a WebSphere® Portal provided by IBM Corporation is an operational environment that is divided into four tiers, a Web tier, a Demilitarized Zone tier, a Product tier, and a Back-end Application tier from left to right in a WebSphere® Portal operation environment diagram as shown in FIG. 10.

Figure 3A:
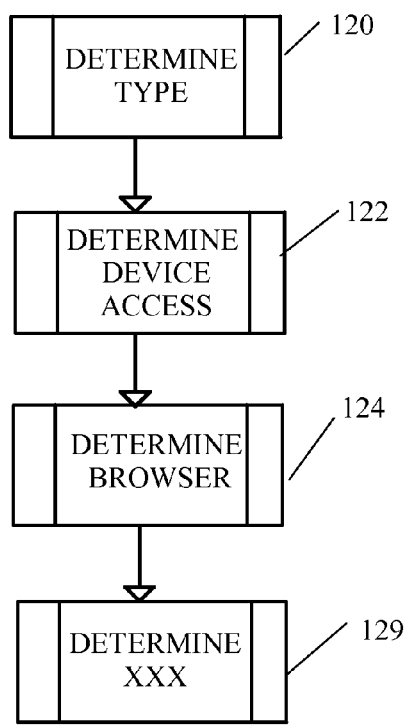
FIGS. 3a-3c show a flowchart for a method of determining application requirements for a project.
Figure 3B:
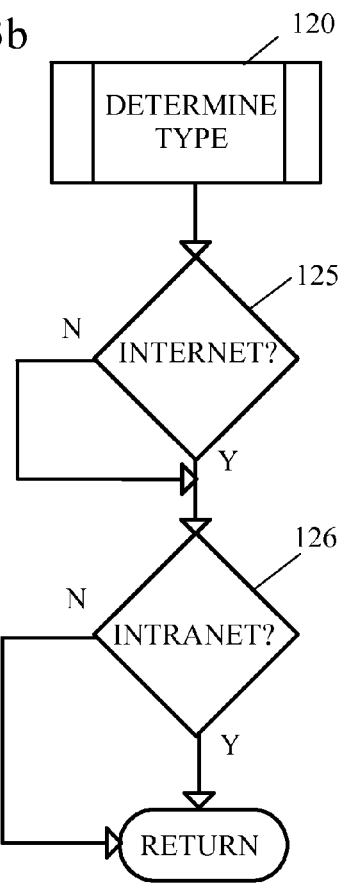
Figure 3C:
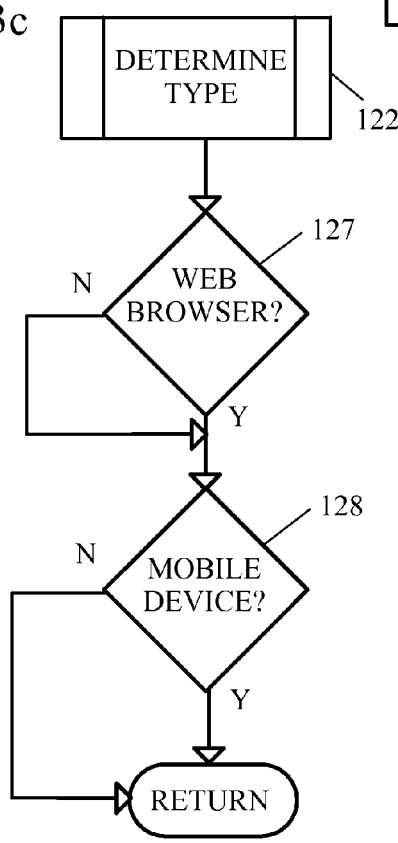

As an example, for the Web tier, the application architect 101 needs to know what type of users will be using the application, Internet users or Intranet users, or determine type of website (step 120) as shown in FIGS. 3a-3c. The application architect 101 indicates that the type of website is to be Internet only (step 125), Intranet only (step 126) or both, through an interface 60, 116 for example as shown in FIG. 4a.

After the type of website is determined, return to determine what type of devices will access the website (step 122). The application architect 101 indicates that the devices used to access the website are a web browser (step 127), a mobile phone (step 128) or both through an interface 60, 116 for example as shown in FIG. 4b, and returns to determine the type of web browser (step 124). This process continues to determine what types of access is needed for the application (step 129). While only a few questions are shown, other questions in this example regarding the Web tier, Demilitarized Zone (DMZ) tier, Product tier, and Back-end Application tier would also be answered by the application architect 101. It should be noted that other tiers and questions may be present based on the application being created.

Once the application architect 101 has answered all questions, the selections made by the application architect 101 are submitted to the architecture design solution repository 102. The architecture design solution repository 102 contains architecture design solution modules which are each constructed within the repository 102 as data object trees 130, each of which are connected together to be an even larger tree as shown for example in FIG. 5. Each data object tree is independent from other data object trees with a data object tree for each aspect of the application architecture.

For example, continuing with the example of FIG. 10, a Web tier data object tree, a DMZ tier data object tree, a Product tier data object tree, and a Back-end tier data object tree all of which are connected into an even larger data object tree. Each node 132 of the tree is a data object. A data object includes at least the following attributes: Question, Answer, Description, Graphical Representation, Configuration, Customization, Implementation, Sample Codes, and Tips as shown in Table 1 below, although other attributes may also be used.

TABLE 1

Example of a Data Object

| Attribute | Value |
| --- | --- |
| Question | Type of web site? |
| Answer | Internet/Intranet/Both |
| Description | If Internet: Internet website, users from external world |
| | If Intranet: Intranet website; users from internal network |
| Graphical Representation | If Internet: internet.jpg |
| | If Intranet: intranet.jpg |
| Configuration | If Internet: Users use web browser to access portal website |
| | If Intranet: Users use web browsers to access portal website |
| Customization | The web browser is configured to be SSL enabled. |
| Implementation | N/A |
| Sample Codes | N/A |
| Tips | N/A |

Figure 5:
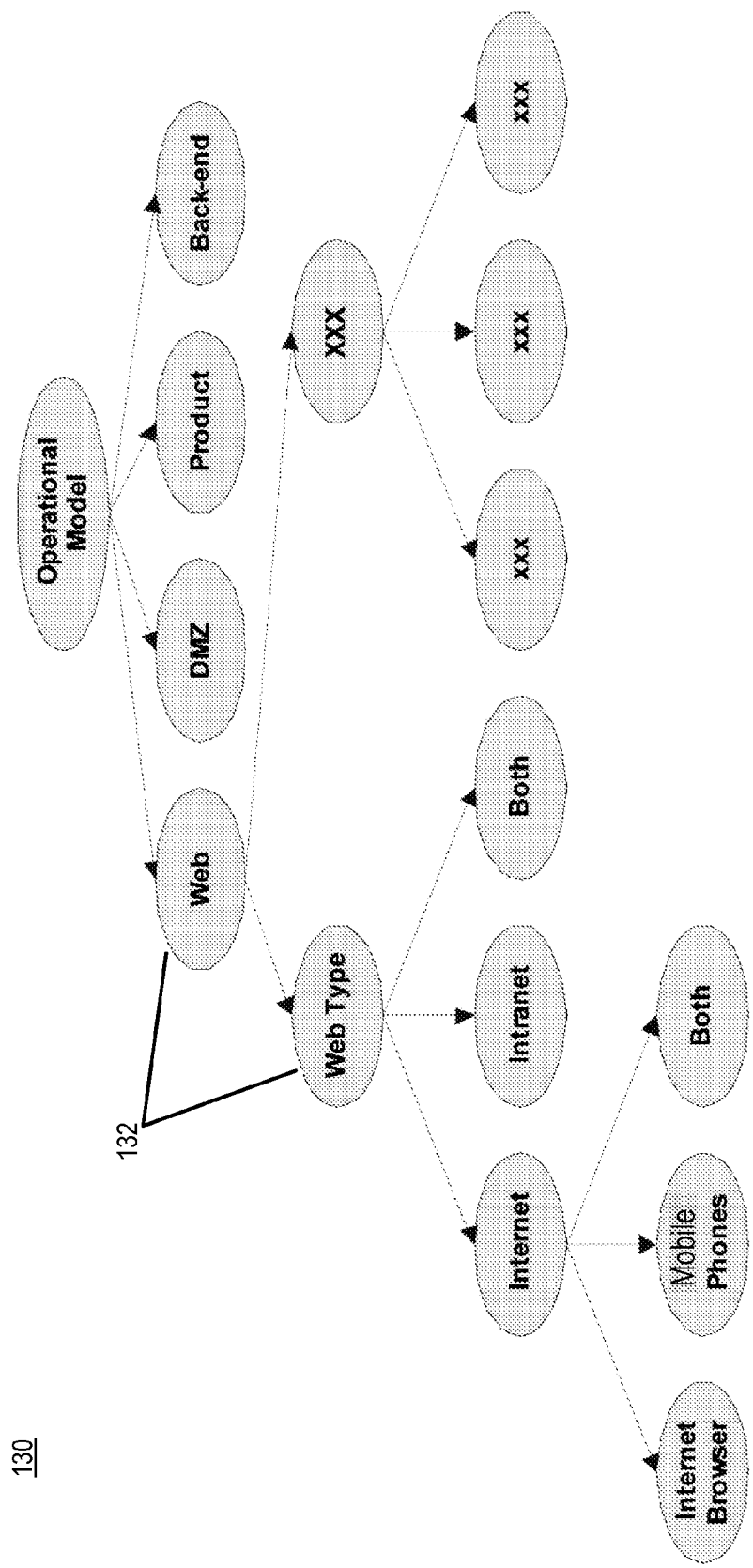
FIG. 5 shows an example of a data object tree.

A data object tree 130 may also be implemented for other aspects of application architecture besides the aspects shown in FIG. 5, for example for a security aspect of the application architecture.

Figure 6:
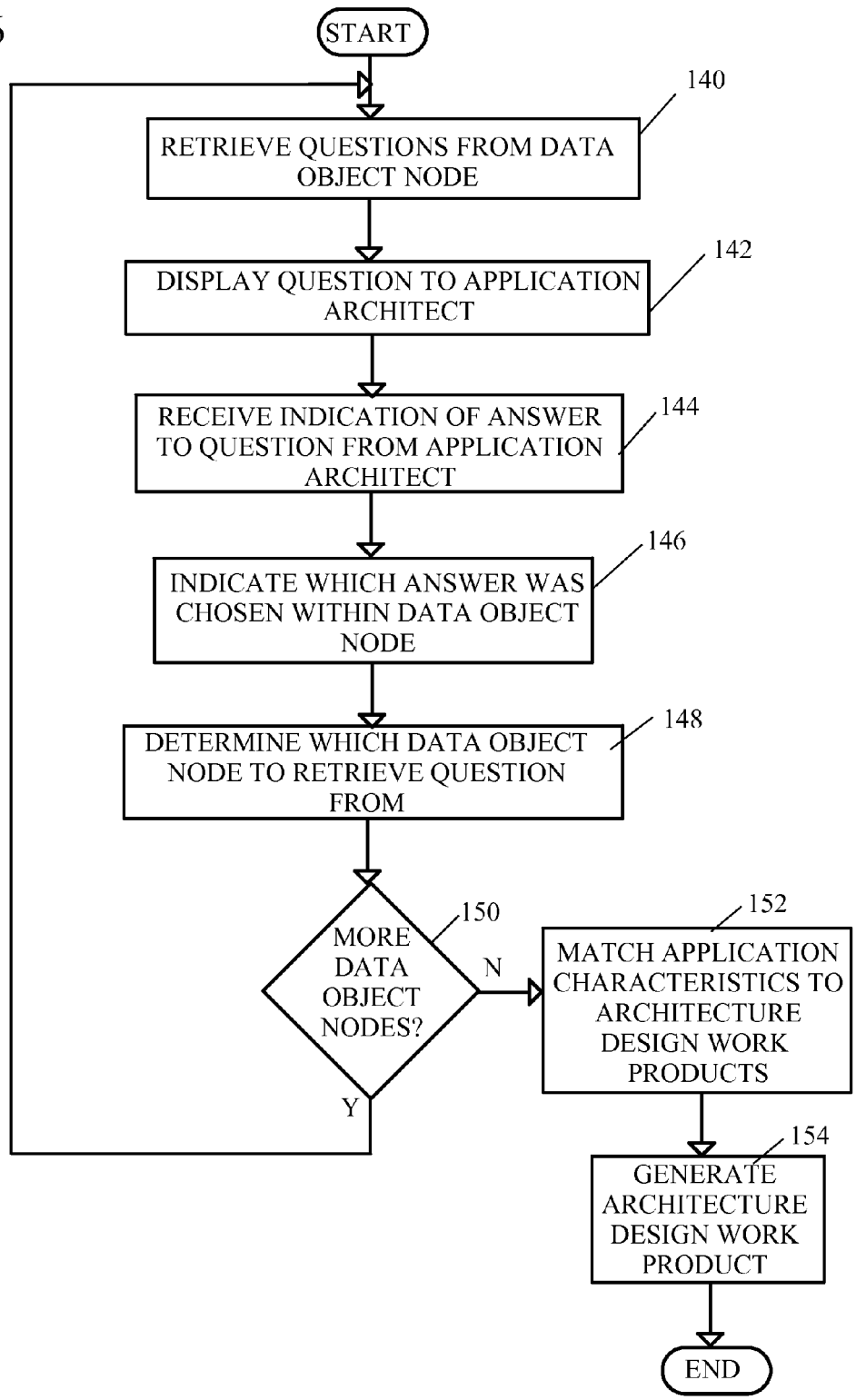
FIG. 6 shows a flowchart of a method of using a data tree to acquire application requirements for a project.

Referring back to FIG. 5, the question and answer user interface 116, travels from node 132 to node 132 on the data object tree 130 by the method shown in FIG. 6 and exemplified in FIG. 9 and is discussed in further detail below.

An interface, for example through an application characteristic program 68, retrieves a question from the data object node 132 (step 140). The question is displayed to the application architect 101 through an interface, such as interface 60 as shown in FIG. 1 or interface 116 in FIGS. 4a-4b (step 142). The question and answer user interface 116 receives question answers from the application architect 101 (step 144). The question and answer interface 116 indicates which answer was chosen by the application architect 101 within the data object node (step 146). The question and answer interface 116 determines which data object node to retrieve the next question from based on the answers received from the application architect 101 (step 148). If there are more data nodes to explore (step 150), return to step 140 of the question and answer user interface 116 retrieving a question from the data object node.

If there are no more data nodes to explore (step 150), an application characteristic program 68 through the question and answer interface determines which architecture design solution 110 present within the architecture design solution repository 102 matches the application characteristics required by the application architect (step 152). Once the architecture design solution is determined in step 152, a work product generator program 66 generates an architecture design work product 114 for the application architect (step 154) and the method ends. It should be noted that different parts of different architecture design solutions 110 may be used to satisfy the application requirements as set forth by the application architect.

The architecture design solutions for an application has many aspects and may include architecture, infrastructure architecture, security architecture, etc. . . . The solution in each aspect or area is a module in the architecture design solution repository 102. Each module is design and implemented as a data object tree 130 as shown in FIG. 5.

A subject matter expert 112 updates and imports known architecture design solutions to the system 100 through a solution collector program 67 through the solution and collector updater 108. The solution collector program 67 deconstructs an implemented, known architecture design solution 110 provided by the subject matter expert 112 into points and sub-points which become known solution data object nodes, and organizes those nodes into a tree structure, starting from the root of that tree based on logic relationships.

Each node of the tree is created as a data object using the format as shown in FIG. 5. Once the solution collector program 67 has abstracted or deconstructed the known architecture design solution 110 into known solution data object nodes based on points and sub-points and organizes the nodes into a tree structure, the architecture design solution is stored a module in the architecture design solution repository 102. Maintenance of the architecture design solution within the architecture design solution repository 102 by the subject matter expert 112 may include, but is not limited to adding, updating and deleting a data object node from a data object tree.

Figure 7:
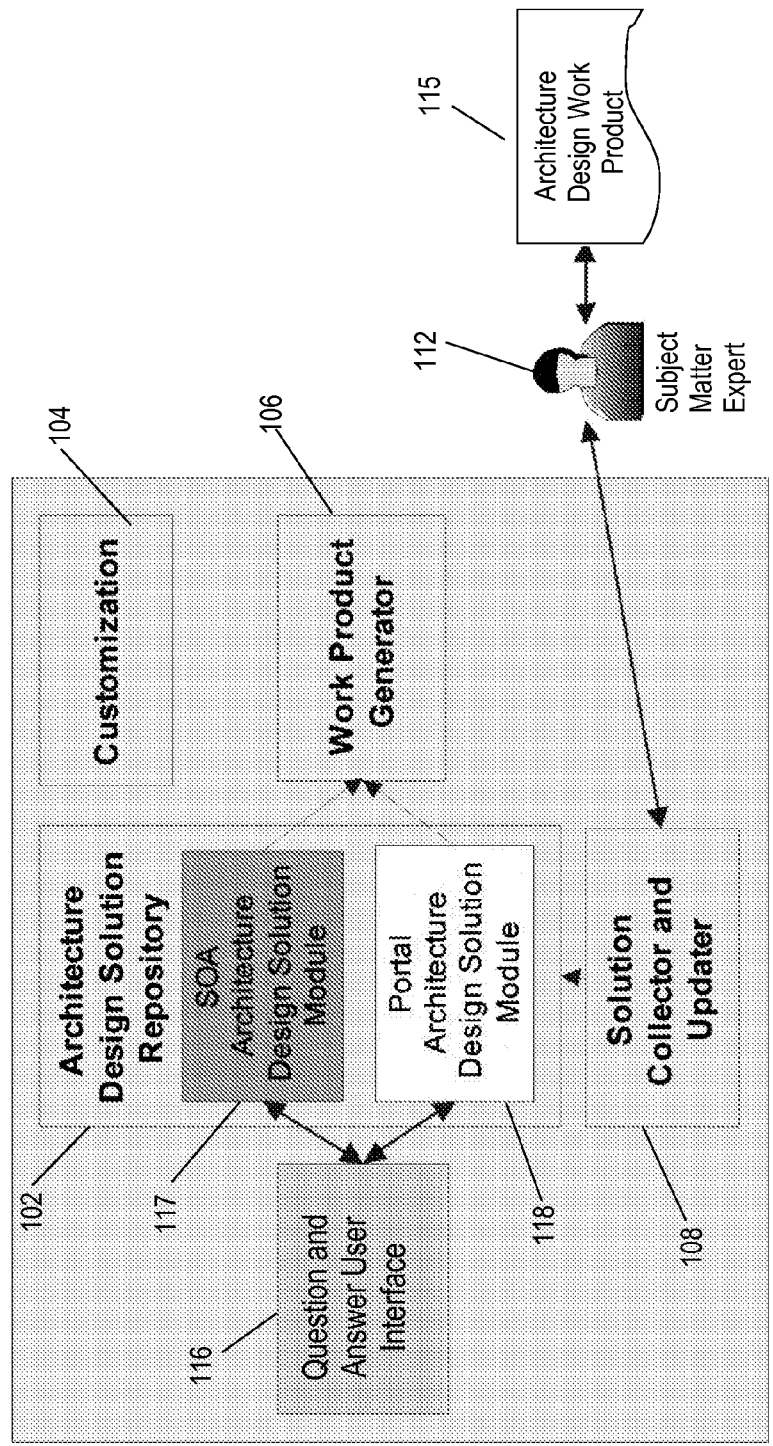
FIG. 7 shows an example of components of the framework for a system including design solution modules within the architecture design solution repository.

For example, as shown in FIG. 7 the architecture design solution repository 102 may contain a portal architecture design solution module 118, and a service-oriented architecture (SOA) architecture design solution module 117. Each module 117, 118 is a plug-in into the system. The modules 117, 118 can be selected to be loaded onto the client computer 52 so that the application architect 101 can work on the many different aspects of an application architecture work.

Figure 8:
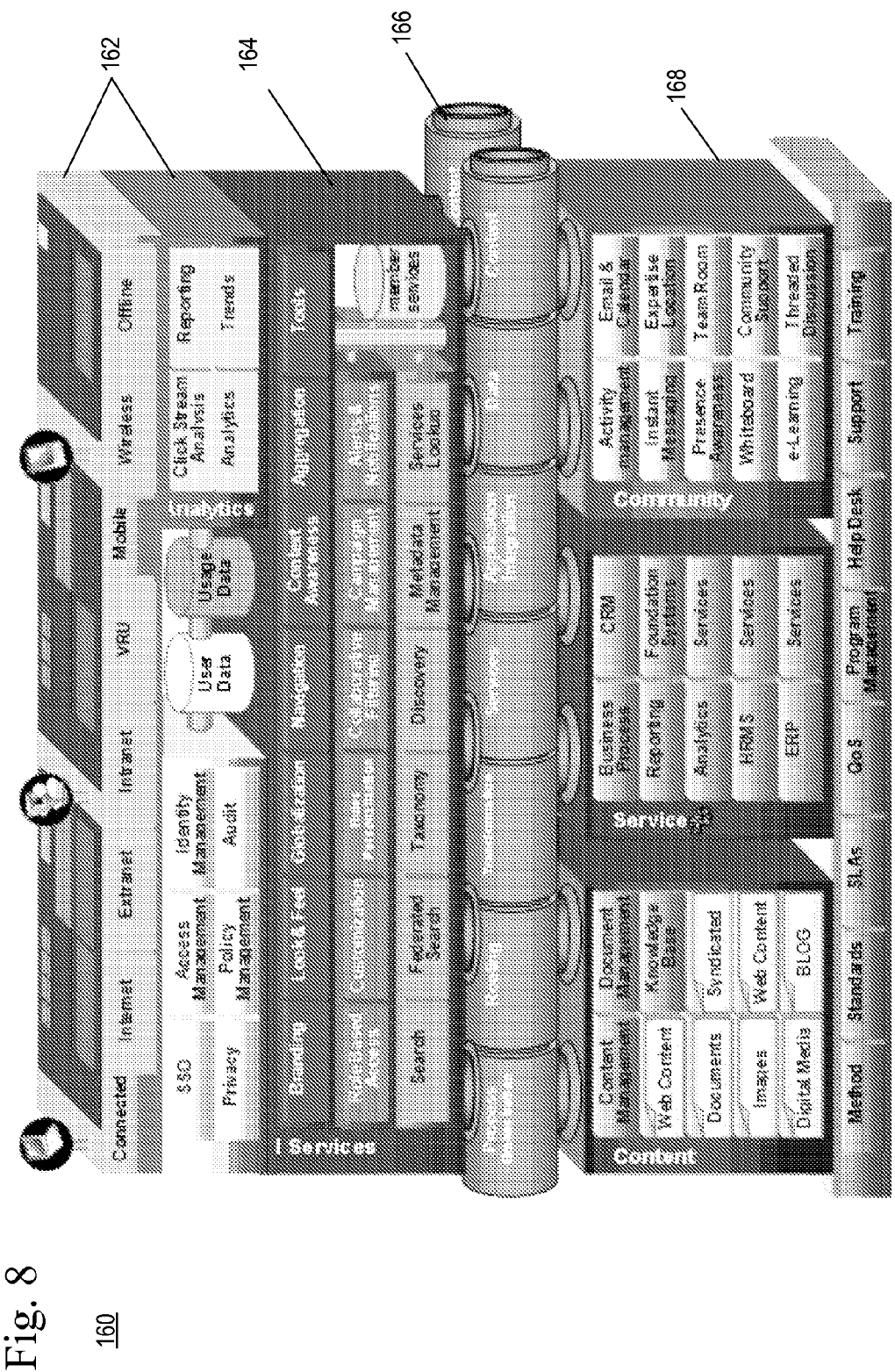
FIG. 8 shows an example of portal reference architecture.

The portal architecture design solution module 118 includes architecture framework for an application architect to design a portal application, for example using WebSphere® provided by IBM Corp. A graphical representation of the portal reference architecture 160 is shown in FIG. 8. The portal reference architecture 160 is a layered structure. The topmost layer of the portal reference architecture 160 is the user interface layer 162 which includes web devices to display contents, processes, and applications to users. The layer under the user interface layer 162 is the service layer 164. The service layer 164 includes services to supply data, contents, processes, and applications to the user interface layer 162 to display. The layer under the service layer 164 is the enterprise bus layer 166. The enterprise bus layer 166 provides connects to various back-end data repositories, information resources and legacy applications. The layer at the bottom of the portal reference architecture 160 is the data resource layer 168 which provides data, contents and legacy applications.

Referring back to FIG. 6, a subject matter expert 112, for example a portal architecture expert designs the portal architecture design solution module and imports it into the architecture design solution repository 102 of the system using the solution collector and updater 108. The portal architecture expert can use the solution collector and updater 108 to keep updating this module ensuring that the contents are up to date.

The work product generator 106 generates architecture design work products for example through a work product generator program 66. The work product generator 106 retrieves stored answers from the application architect 101 and matches the answers to the data objects in the architecture design solution repository 102. From the matched data objects, the system retrieves the contents to generate an architecture design work product 114.

An architecture design work product 114 preferably contains a textual part (see below) and a graphical part (see FIGS.

10-13). The textual part is generated by retrieving the descriptions from data objects. The graphical part is generated by retrieving the graphical representation from data objects. The work product generator 106 traverses the data object tree 130 and retrieves the description from each data object to compose a work product, as shown in FIG. 9.

Figure 9:
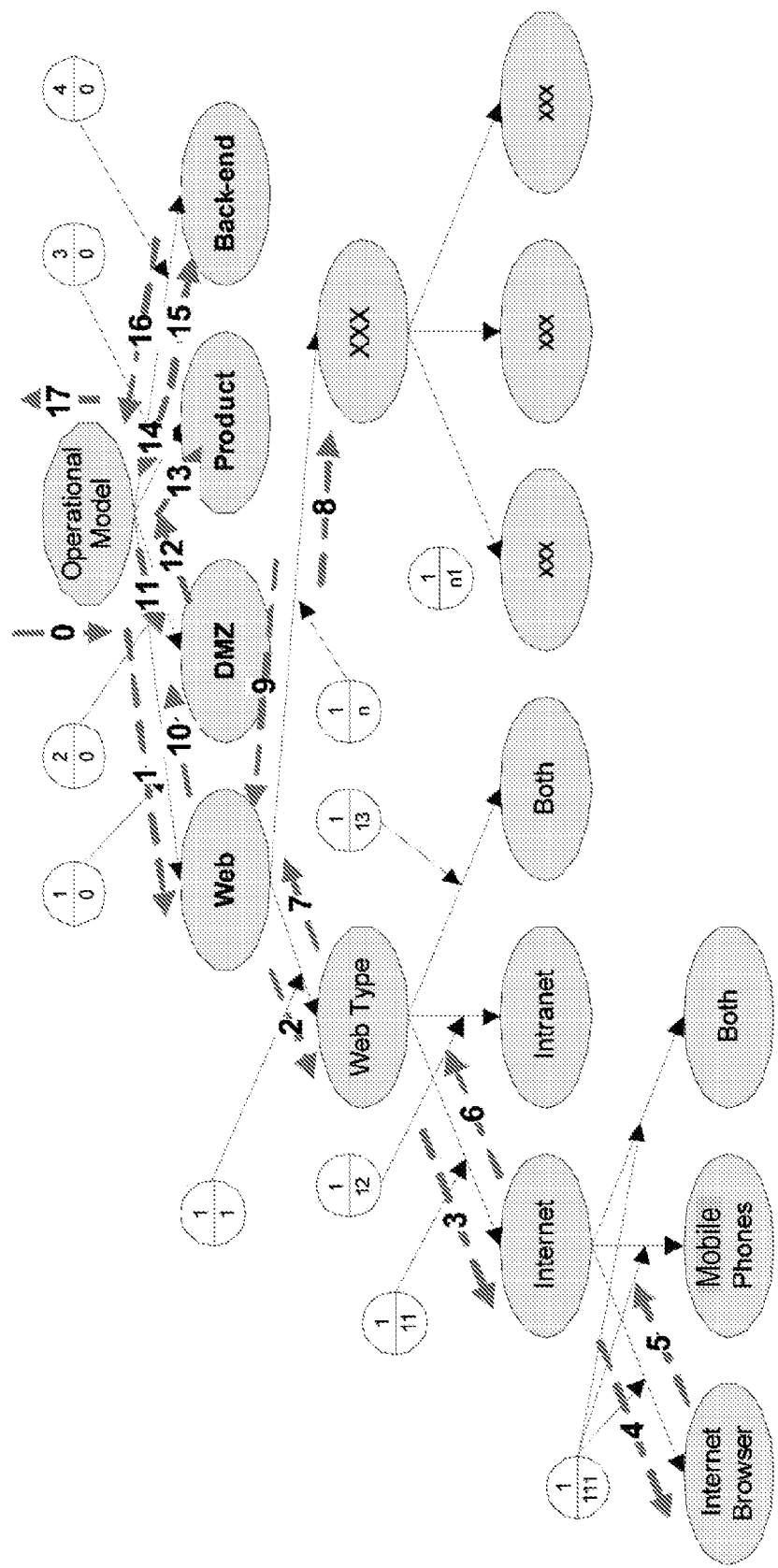
FIG. 9 shows a data object tree showing paths of traversing the tree.

For example and referring to FIG. 9, starting with operational model node of section 1, the work product generator program 66 travels as indicated by dashed line 0 to the operational model. From the operational model node in Section 1, a work product generator program 66 travels to the web node, Section 11.0 as indicated by dashed line 1 to determine which answer was chosen by the application architect 101 within the data object node. From the web tier node, a work product generator program 66 travels as indicated by dashed line 2 to Section 11.1 to the web type node to determine which answer was chosen by the application architect 101 within the data object node. From the web type node, a work product generator program 66 travels as indicated by dashed line 3 to Section 11.11 to the Internet node to determine which answer was chosen by the application architect 101 within the data object node. From the Internet node, a work product generator program 66 travels as indicated by dashed line 4 to Section 1.111 to the Internet Browser node to determine which answer was chosen by the application architect 101 within the data object node. From the Internet Browser node, a work product generator program 66 travels to the web tier node Section 11.0 through dashed lines 5, 6, 7.

From the web tier node, a work product generator program 66 travels to Section 11.N as indicated by dashed line 8 to node XXX. Once the work product generator program 66 has traveled through all of the nodes xxx, the work product generator program 66 travels back to the web tier node as indicated by dashed line 9 and moves to the operational model node as indicated by dashed line 10. From the operational model node, a work product generator program 66 travels to the DMZ tier web node as indicated by dashed line 11 to Section 2.0 and travels through all the nodes (not shown) and back to the operational model node as indicated by dashed line 12. From the operational model node, a work product generator program 66 travels to the Product tier web node as indicated by dashed line 13 to Section 3.0 and travels through all the nodes (not shown) and back to the operational model node as indicated by dashed line 14. From the operational model node, a work product generator program 66 travels to the Back-end tier web node as indicated by dashed line 15 to Section 4.0 and travels through all the nodes (not shown) and back to the operational model node as indicated by dashed line 16. From the operational mode node, a work product generation program 66 ends the travel of the data object tree as indicated by dashed line 17.

Assuming that the data objects are structured as shown in FIG. 9, the text portion of the architecture design work product 114 may be structured as follows:
Section 1.0 Operational Model
   Section 1.1 Web Tier
   Section 1.11 Internet
     Section 1.111 Internet Browser
. . .
   Section 1.N XXX
. . .
   Section 2.0 DMZ Tier
. . .
   Section 3.0 Product Tier
. . .
   Section 4.0 Back-end Tier
. . .

Figure 11:
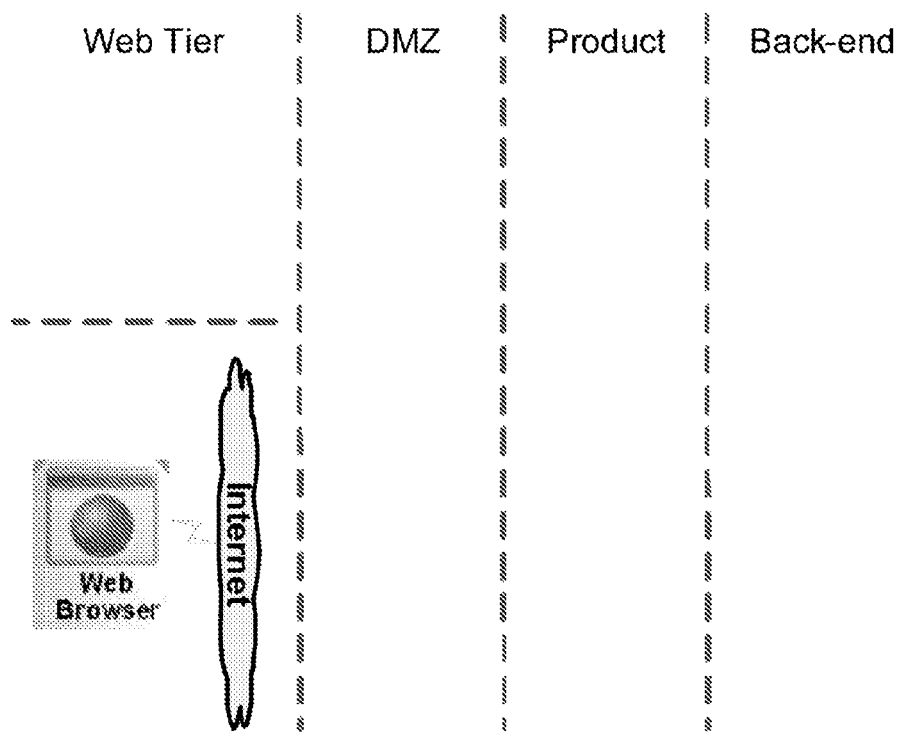
FIG. 11 shows an example of an operational model diagram from data objects of a data object tree if the type of website is Internet only and access is limited to a web browser.
Figure 12:
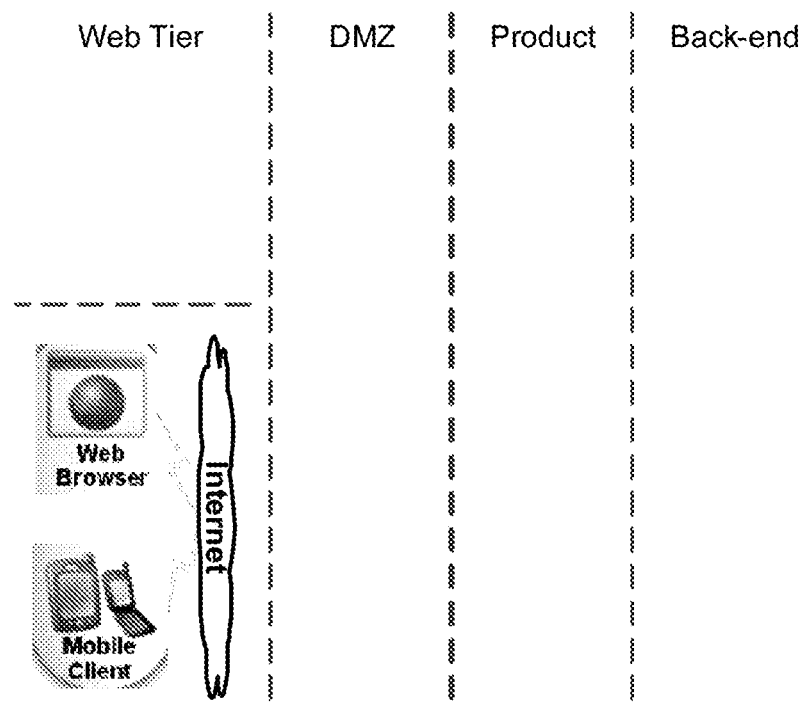
FIG. 12 shows an example of an operational model diagram from data objects of a data object tree if the type of website is Internet only and access is by a web browser and mobile devices.
Figure 13:
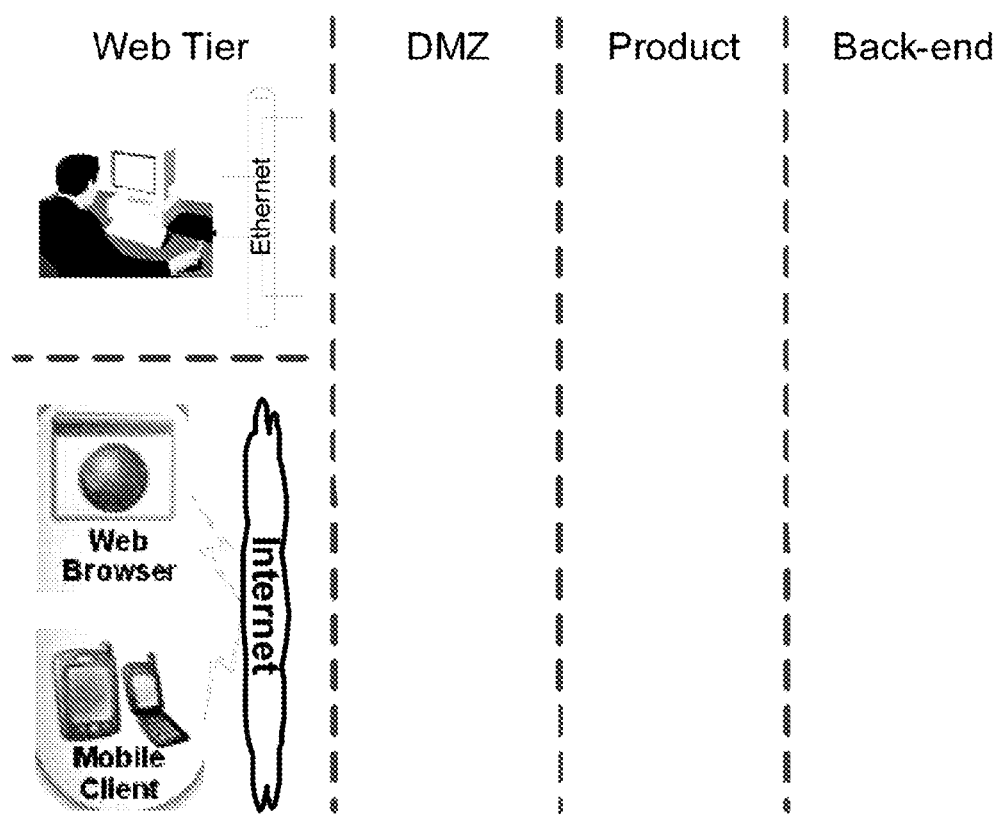
FIG. 13 shows an example of an operational model diagram from data objects of a data object tree if the type of website is Internet and Intranet and access is by a web browser and mobile devices.

The work product generator 106 can also generate a graphical operational model diagram from the data objects. For example, if the website was to be Intranet type only, the web tier of the operational model diagram would be as shown in FIG. 10. In another example, if the website was to be Internet type only and the access was to be by a web browser only, the web tier of the graphical operational model would be displayed as shown in FIG. 11. In another example, if the website was to be Internet type only and the access was to be by a web browser and mobile device, the web tier of the graphical operational model would be displayed as shown in FIG. 12. In yet another example, if the website was to be both Internet and Intranet and the access was to be by a web browser, the web tier of the graphical operational model would be displayed as shown in FIG. 13.

The work product generator 106 can also generate other common architecture design work products for an application such as Architectural Decisions; Architecture Overview Diagram; Component Model; Deployment Unit; Operational Model; Non-functional Requirements; and Security Architecture.

The work products generated by the system are preferably specific to an application and some of the descriptions of data object nodes use meta-data.

The work products generated by the system are preferably specific to an application and since specific information may not be available at the time of creation of the work products, meta-data is used as a place holder. The meta-data may be words and/or phrases such as application name, customer name, computer node ID, computer names, etc. . . . The customization component 104 allows a user to enter the exact words and phrases to replace and manage the meta-data at a later time when the specific information is available regarding the application.

When the application architect requests to generate work products, the work product generator 106 retrieves those values from the customization component 104, and replaces those meta-data in the description of data object nodes with those words and phrases. In this way, the work product generator 106 can generate the work products specific to an application.

For example, if the description within the work product is "display this computer name [computer name] in the footer of a portal page" and the application architect does not have the specific computer name at the time of work product generation, the phrase "computer name" acts as place holder and is the meta-data. Through the customization component 104, an application architect can replace the meta-data, in this case "computer name" with "cloudlexbz3039.lexington.ibm.com" for example, so that the work product generated would then read "display this computer name cloudlexbz3039.lexington.ibm.com in the footer of a portal page" within the work product generated.

FIG. 14 illustrates internal and external components of client computer 52 and server computer 54 in which illustrative embodiments may be implemented. In FIG. 14, client computer 52 and server computer 54 include respective sets of internal components 800*a*, 800*b*, and external components 900*a*, 900*b*. Each of the sets of internal components 800*a*, 800*b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, a work product generator program 66, an application characteristic program 68 and a solution collector program 67 are stored on one or more of the computer-readable tangible storage devices 830 for execution by one or more of the processors 820 via one or more of the RAMs 822 (which typically include cache memory). In the embodiment illustrated in FIG. 14, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Work product generator program 66, an application characteristic program 68 and solution collector program 67 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Work product generator program 66, an application characteristic program 68 and solution collector program 67 can be downloaded to computer 52 and server computer 54 from an external computer via a network (for example, the Internet, a local area network or other, wide area network) and network adapter or interface 836. From the network adapter or interface 836, work product generator program 66, an application characteristic program 68 and solution collector program 67 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 940. Each of the sets of internal components 800a, 800b also includes device drivers 840 to interface to computer display monitor 920, keyboard 930 and computer mouse 940. The device drivers 840, R/W drive or interface 832 and network adapter or interface 836 comprise hardware and software (stored in storage device 830 and/or ROM 824).

A work product generator program 66, an application characteristic program 68 and a solution collector program 67 can be written in various programming languages including low-level, high-level, object-oriented or non object-oriented languages. Alternatively, the functions of a work product generator program 66, an application characteristic program 68 and a solution collector program 67 can be implemented in whole or in part by computer circuits and other hardware (not shown).

Based on the foregoing, a computer system, a method and a program product have been disclosed for customizing architecture solutions and work product generation to requirements of an application. However, numerous modifications and substitutions can be made without deviating from the scope of the present invention. Therefore, the present invention has been disclosed by way of example and not limitation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of customizing architecture design work products to requirements of an application, using an architecture design solution repository including architecture design solutions comprising a plurality of data object trees each with a plurality of data object nodes, the method comprising the steps of:
    a computer retrieving a question regarding the requirements of the application from a data object node of a plurality of data object nodes of the architecture design solution repository;
    the computer displaying the question regarding the requirements of the application to an application user through an interface linked to the architecture design solution repository;
    the computer receiving an indication of answers chosen by the application user to the question regarding the requirements of the application displayed through the interface linked to the architecture design solution repository;
    the computer indicating within the data object node of the plurality of data object nodes which answers were chosen by the application user;
    the computer determining which data object node of the plurality of data object nodes to retrieve another question from based on the answers chosen by the application user;
    the computer repeating display of questions regarding the requirements of the application to the application user through the interface linked to the architecture design solution repository until all questions are answered by the application user;
    the computer determining which architecture design solution within the architecture design solution repository matches the requirements of the application indicated by the answers chosen by the application user; and
    the computer generating an architecture design work product based on matching the plurality of data object nodes to the architecture design solutions included within the architecture design solution repository.

2. The method of claim 1, further comprising:
    the computer deconstructing an implemented, known architecture design solution provided by an expert user into a plurality of known solution data object nodes;
    the computer constructing at least one known architecture design solution data object tree from the plurality of known solution data object nodes; and
    the computer storing the at least one known architecture design solution data object tree into the architecture design solution repository.

3. The method of claim 1, further comprising receiving a customization of the architecture design work product from the application user.

4. The method of claim 1, wherein the architecture design work product comprises a text portion and a graphical portion.

5. The method of claim 4, wherein the graphical portion of the architecture design work product is generated by retrieving a graphical representation of the plurality of data object nodes from a data object tree of the plurality of data object trees that matches the requirements of the application indicated by the answers chosen by the application user.

6. The method of claim 4, wherein the text portion of the architecture design work product is generated by retrieving a description of the plurality of data object nodes from a data object tree of the plurality of data object trees that matches the requirements of the application indicated by the answers chosen by the application user.

7. A computer program product for customizing architecture design work products to requirements of an application, using an architecture design solution repository including architecture design solutions comprising a plurality of data object trees each with a plurality of data object nodes, the computer program product comprising:
    one or more computer-readable, tangible storage devices;
    computer-readable program instructions, stored on at least one of the one or more computer-readable, tangible storage devices, to retrieve a question regarding the requirements of the application from a data object node of a plurality of data object nodes of the architecture design solution repository;
    computer-readable program instructions, stored on at least one of the one or more computer-readable, tangible storage devices, to display the question regarding the requirements of the application to an application user through an interface linked to the architecture design solution repository;
    computer-readable program instructions, stored on at least one of the one or more computer-readable, tangible storage devices, to receive an indication of answers chosen by the application user to the question regarding the requirements of the application displayed through the interface linked to the architecture design solution repository;

computer-readable program instructions, stored on at least one of the one or more computer-readable, tangible storage devices, to indicate within the data object node of the plurality of data object nodes which answers were chosen by the application user;

computer-readable program instructions, stored on at least one of the one or more computer-readable, tangible storage devices, to determine which data object node of the plurality of data object nodes to retrieve another question from based on the answers chosen by the application user;

computer-readable program instructions, stored on at least one of the one or more computer-readable, tangible storage devices, to repeat displaying of questions regarding the requirements of the application to the application user through the interface linked to the architecture design solution repository until all questions are answered by the application user;

computer-readable program instructions, stored on at least one of the one or more computer-readable, tangible storage devices, to determine which architecture design solution within the architecture design solution repository matches the requirements of the application indicated by the answers chosen by the application user; and computer-readable program instructions, stored on at least one of the one or more computer-readable, tangible storage devices, to generate an architecture design work product based on matching the plurality of data object nodes to the architecture design solutions included within the architecture design solution repository.

8. The computer program product of claim 7, further comprising:

computer-readable program instructions, stored on at least one of the one or more computer-readable, tangible storage devices, to deconstruct an implemented, known architecture design solution provided by an expert user into a plurality of known solution data object nodes;

computer-readable program instructions, stored on at least one of the one or more computer-readable, tangible storage devices, to construct at least one known architecture design solution data object tree from the plurality of known solution data object nodes; and computer-readable program instructions, stored on at least one of the one or more computer-readable, tangible storage devices, to store the at least one known architecture design solution data object tree into the architecture design solution repository.

9. The computer program product of claim 7, further comprising computer-readable program instructions, stored on at least one of the one or more computer-readable, tangible storage devices, to receive a customization of the architecture design work product from the application user.

10. The computer program product of claim 7, wherein the architecture design work product comprises a text portion and a graphical portion.

11. The computer program product of claim 10, wherein the graphical portion of the architecture design work product is generated by retrieving a graphical representation of the plurality of data object nodes from a data object tree of the plurality of data object trees that matches the requirements of the application indicated by the answers chosen by the application user.

12. The computer program product of claim 10, wherein the text portion of the architecture design work product is generated by retrieving a description of the plurality of data object nodes from a data object tree of the plurality of data object trees that matches the requirements of the application indicated by the answers chosen by the application user.

13. A computer system for customizing architecture design work products to requirements of an application, the computer system comprising:

one or more processors;

one or more computer-readable memories;

one or more computer-readable, tangible storage devices;

an architecture design solution repository comprising architecture design solutions comprising a plurality of data object trees each with a plurality of data object nodes;

a work product generator linked to the architecture design solution repository configured to generate customizable architecture design work products for the application;

computer-readable program instructions, stored on at least one of the one or more computer-readable, tangible storage devices for execution by at least one of the one or more processors via at least one of the one or more computer-readable memories, to retrieve a question regarding the requirements of the application from a data object node of a plurality of data object nodes of the architecture design solution repository;

computer-readable program instructions, stored on at least one of the one or more computer-readable, tangible storage devices for execution by at least one of the one or more processors via at least one of the one or more computer-readable memories, to display the question regarding the requirements of the application to an application user through an interface linked to the architecture design solution repository;

computer-readable program instructions, stored on at least one of the one or more computer-readable, tangible storage devices for execution by at least one of the one or more processors via at least one of the one or more computer-readable memories, to receive an indication of answers chosen by the application user to the question regarding the requirements of the application displayed through the interface linked to the architecture design solution repository;

computer-readable program instructions, stored on at least one of the one or more computer-readable, tangible storage devices for execution by at least one of the one or more processors via at least one of the one or more computer-readable memories, to indicate within the data object node of the plurality of data object nodes which answers were chosen by the application user;

computer-readable program instructions, stored on at least one of the one or more computer-readable, tangible storage devices for execution by at least one of the one or more processors via at least one of the one or more computer-readable memories, to determine which data object node of the plurality of data object nodes to retrieve a next question from based on the answers chosen by the application user;

computer-readable program instructions, stored on at least one of the one or more computer-readable, tangible storage devices for execution by at least one of the one or more processors via at least one of the one or more computer-readable memories, to repeat displaying of questions regarding the requirements of the application to the application user through the interface linked to the architecture design solution repository until all questions are answered by the application user;

computer-readable program instructions, stored on at least one of the one or more computer-readable, tangible storage devices for execution by at least one of the one or more processors via at least one of the one or more computer-readable memories, to determine which architecture design solution within the architecture design solution repository matches the requirements of the application indicated by the answers chosen by the application user; and computer-readable program instructions, stored on at least one of the one or more computer-readable, tangible storage devices for execution by at least one of the one or more processors via at least one of the one or more computer-readable memories, to generate an architecture design work product through the work product generator based on matching the plurality of data object nodes to the architecture design solutions included within the architecture design solution repository.

14. The computer system of claim 13, further comprising a solution collector and updater linked to the architecture design solution repository and configured to collect and update architecture design solutions included within the architecture design solution repository;

computer-readable program instructions, stored on at least one of the one or more computer-readable, tangible storage devices for execution by at least one of the one or more processors via at least one of the one or more computer-readable memories, to deconstruct an implemented, known architecture design solution provided by an expert user into a plurality of known solution data object nodes;

computer-readable program instructions, stored on at least one of the one or more computer-readable, tangible storage devices for execution by at least one of the one or more processors via at least one of the one or more computer-readable memories, to construct at least one known architecture design solution data object tree from the plurality of known solution data object nodes; and computer-readable program instructions, stored on at least one of the one or more computer-readable, tangible storage devices for execution by at least one of the one or more processors via at least one of the one or more computer-readable memories, to store the at least one known architecture design solution data object tree into the architecture design solution repository.

15. The computer system of claim 13, further comprising computer-readable program instructions, stored on at least one of the one or more computer-readable, tangible storage devices for execution by at least one of the one or more processors via at least one of the one or more computer-readable memories, to receive a customization of the architecture design work product from the application user.

16. The computer system of claim 13, wherein the architecture design work product comprises a text portion and a graphical portion.

17. The computer system of claim 16, wherein the graphical portion of the architecture design work product is generated by retrieving a graphical representation of the plurality of data object nodes from a data object tree of the plurality of data object trees that matches the requirements of the application indicated by the answers chosen by the application user.

18. The computer system of claim 16, wherein the text portion of the architecture design work product is generated by retrieving a description of the plurality of data object nodes from a data object tree of the plurality of data object trees that matches the requirements of the application indicated by the answers chosen by the application user.

* * * * *